United States Patent
Shneerson et al.

(10) Patent No.: US 7,802,199 B2
(45) Date of Patent: Sep. 21, 2010

(54) ENABLE RIBBON RELOADING VIA A PROXY ADD-IN

(75) Inventors: Misha Shneerson, Redmond, WA (US); David Andrew Whitechapel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/947,785

(22) Filed: Nov. 30, 2007

(65) Prior Publication Data

US 2009/0144645 A1    Jun. 4, 2009

(51) Int. Cl.
G06F 7/00        (2006.01)
G06F 17/00       (2006.01)
(52) U.S. Cl. .................................................. 715/810
(58) Field of Classification Search ................. 707/634
See application file for complete search history.

(56) References Cited

U.S. PATENT DOCUMENTS

| | | | |
|---|---|---|---|
| 5,220,675 A | | 6/1993 | Padawer et al. |
| 2003/0097640 A1* | | 5/2003 | Abrams et al. ............. 715/530 |
| 2006/0161863 A1* | | 7/2006 | Gallo ........................ 715/810 |
| 2006/0168522 A1 | | 7/2006 | Bala |
| 2006/0271910 A1 | | 11/2006 | Burcham et al. |
| 2007/0055936 A1 | | 3/2007 | Dhanjal et al. |
| 2007/0055943 A1 | | 3/2007 | McCormack et al. |
| 2007/0143662 A1* | | 6/2007 | Carlson et al. ............. 715/507 |

OTHER PUBLICATIONS

"Create Office add-ins: ribbons, toolbars, task panes, menus etc.", http://www.add-in-express.com/creating-addins-blog/feed/.
"RibbonX API: Extend the 2007 Office System with Your Own Ribbon Tabs and Controls", Date: 2007, Microsoft Corporation, http://msdn.microsoft.com/msdnmag/issues/07/02/RibbonX/default.aspx.
"What's New in Excel 2007", Date: Feb. 26, 2007.
Whitechapel, et al., "Microsoft Visual Studio 2005 Tools for the 2007 Microsoft Office", Date: Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005+SE&hl=en&ct=clnk&cd=3&gl=in.

* cited by examiner

*Primary Examiner*—John R. Cottingham
*Assistant Examiner*—Nicholas E Allen

(57) ABSTRACT

Various technologies and techniques are disclosed for enabling ribbon re-loading through a proxy add-in. A ribbon proxy add-in is loaded that has ribbon customizations for a ribbon of a primary add-in. The primary add-in is also loaded. At a later point in time, the ribbon proxy add-in is unloaded and reloaded, which causes a host application to re-query the ribbon proxy add-in for the ribbon customizations. Since the ribbon proxy add-in points to the ribbon customizations of the primary add-in, the ribbon of the primary add-in is updated as a result.

20 Claims, 6 Drawing Sheets

ENABLE RIBBON RELOADING VIA A PROXY ADD-IN

BACKGROUND

Software applications allow end users to interact with the functionality of the application through user interface elements, such as toolbars. With the release of MICROSOFT® Office 2007, a new type of user interface model was introduced, which provided toolbars in the form of "ribbons". Ribbons group together related operations based upon a task that the user is trying to perform, and typically provide graphical representations of those operations. One way that a ribbon can be loaded is through an add-in, which is a component that is dynamically discovered and loaded by its host. To load a ribbon as an add-in, the add-in is queried by the host application (such as a MICROSOFT® Office 2007 program) to see if the add-in implements the ribbon customizations. If so, then the host application asks the add-in to supply the ribbon customizations. This is the only time that the host application asks for ribbon customizations. With this approach, the ribbon cannot be dynamically modified at a later time.

SUMMARY

Various technologies and techniques are disclosed for enabling ribbon re-loading through a proxy add-in. A ribbon proxy add-in is loaded that has ribbon customizations for a ribbon of a primary add-in. The primary add-in is also loaded. At a later point in time, the ribbon proxy add-in is unloaded and reloaded, which causes a host application to re-query the ribbon proxy add-in for the ribbon customizations. Since the ribbon proxy add-in points to the ribbon customizations of the primary add-in, the ribbon of the primary add-in is updated as a result.

In one implementation, a method for loading a primary add-in and a ribbon proxy add-in on host startup is described. A ribbon proxy add-in is discovered. User interface details are obtained for the ribbon proxy add-in. A primary add-in is discovered. A ribbon on a toolbar menu is updated based upon the user interface details returned for the ribbon proxy add-in.

In another implementation, a method for updating a primary add-in after host startup is described. A determination is made that a primary add-in wants to change an associated ribbon on a toolbar menu. A ribbon proxy add-in is fetched. A request is given to a host application to disconnect the ribbon proxy add-in. A request is given to the host application to reconnect the ribbon proxy add-in. When the ribbon proxy add-in is reconnected by the host application, a customized string associated with the ribbon proxy add-in is loaded, thereby causing the associated ribbon to be updated on the toolbar menu.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a process flow diagram for one implementation illustrating the stages involved in using a ribbon proxy add-in to make dynamic customizations to a primary add-in.

DETAILED DESCRIPTION

The technologies and techniques herein may be described in the general context as an application that enables ribbon re-loading through a proxy add-in, but the technologies and techniques also serve other purposes in addition to these. In one implementation, one or more of the techniques described herein can be implemented as features within a program such as MICROSOFT® Office, or from any other type of program or service that provides ribbon or similar toolbar menus.

Figure 1:
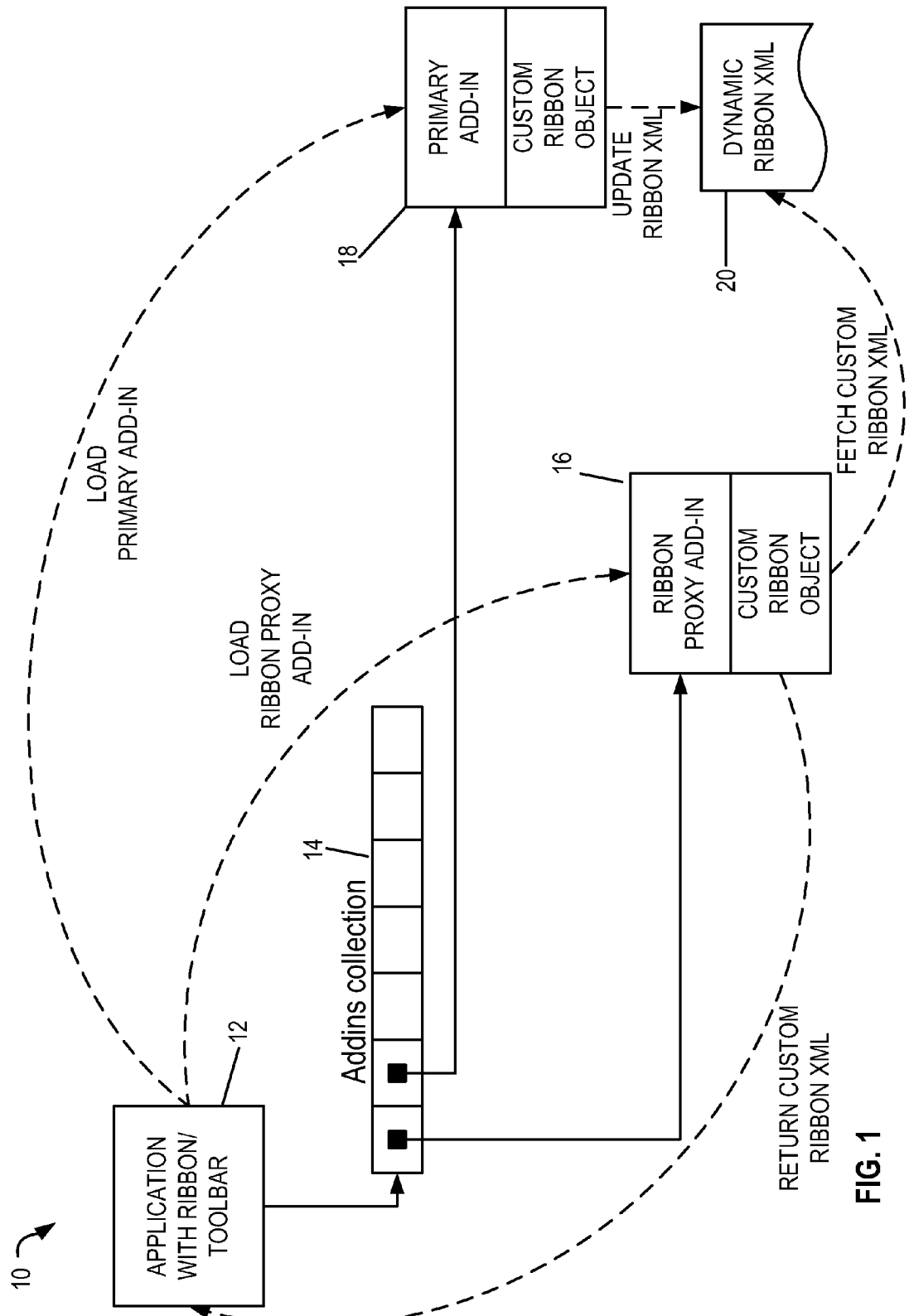
FIG. 1 is a diagrammatic view of a proxy add-in mechanism for customizing a ribbon toolbar dynamically.

FIG. 1 is a diagrammatic view of a proxy add-in mechanism 10 that uses a ribbon proxy add-in to aid in customizing a ribbon toolbar of a primary add-in dynamically. The term "ribbon" as used herein is meant to include a ribbon or other toolbar menu that allows a user to select an option in a user interface from multiple available options. The term "ribbon proxy add-in" is meant to include an add-in that serves as a substitute for a primary add-in in at least some manner, such as to provide information for a primary add-in or perform an operation for a primary add-in. The term "primary add-in" as used herein is meant to include any type of ribbon add-in that is substituted in at least some manner by another add-in. In the implementation shown in FIG. 1, proxy add-in mechanism 10 contains an application with a ribbon/toolbar 12, an add-ins collection 14, a ribbon proxy add-in 16, a primary add-in 18, and a ribbon XML file 20. In other implementations, fewer and/or additional components of proxy add-in mechanism 10 may be used. As a few non-limiting examples, some implementations may not use a ribbon XML file 20, and some implementations may not use an add-ins collection 14.

In one implementation, the ribbon proxy add-in 16 is an add-in that implements an IRibbonExtensibility interface (or other suitable interface[s]). This interface defines one standard get custom user interface function called GetCustomUI (or other suitable function[s]). The host application will call the GetCustomUI function on any add-in that implements IRibbonExtensibility. In such an implementation, the purpose of the GetCustomUI function is to return to the host application a string of XML (from ribbon XML file 20) that represents the ribbon customizations that the add-in wishes to make. Other implementations can use different interfaces and methods for communicating with the add-in and for retrieving the ribbon customizations for the add-in. For example, the IRibbonExtensibility interface, GetCustomUI function, and XML string containing ribbon customizations are just used as examples to illustrate the concepts herein in an exemplary implementation.

The ribbon proxy add-in 16 does not provide its own customizations (e.g. in a ribbon XML). Instead, the ribbon proxy add-in 16 fetches the customizations (in ribbon XML file 20) of the primary add-in 18 that invokes its services. In this way, when the host application (application with ribbon/toolbar 12) retrieves the user interface settings of the ribbon proxy add-in (e.g. by calling the GetCustomUI on the Ribbon Proxy add-in), what is returned is the customizations (e.g. ribbon XML file 20) from the primary add-in 18. Through use of this ribbon proxy add-in 16, the primary add-in 18 can implement dynamic ribbon customization.

In one implementation, a collection of add-ins that are currently loaded can be found in an add-ins collection 14. Various applications can fetch the add-ins collection 14 of the host application (application with ribbon/toolbar 12), and can then fetch a specific add-in from the add-ins collection 14. In order to take part in this collection, an add-in can add itself to this collection when it is loaded. In one implementation, both the ribbon proxy add-in 16 and any other add-in take part in this process by adding themselves to the add-ins collection 14 when they are loaded.

Turning now to FIGS. 2-5 with continued reference to FIG. 1, the stages for implementing one or more implementations of proxy add-in mechanism 10 are described in further detail. In some implementations, the processes of FIG. 2-5 are at least partially implemented in the operating logic of computing device 300 (of FIG. 6).

Figure 2:
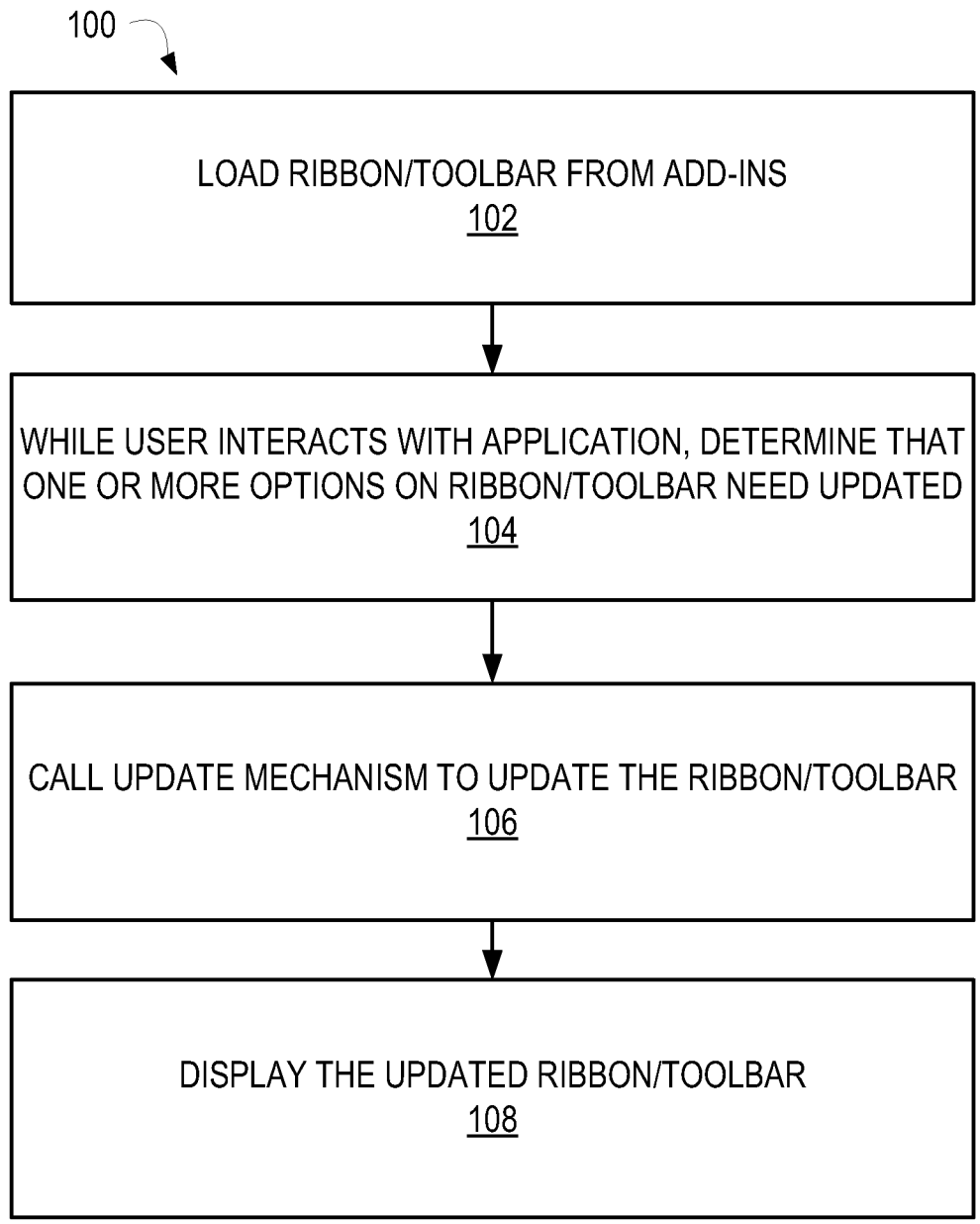
FIG. 2 is a high level process flow diagram for one implementation.

FIG. 2 is a high level process flow diagram 100 for one implementation. Ribbons are loaded from add-ins (stage 102), as described in further detail in FIG. 3. While the user interacts with the application, the system determines that one or more options on the ribbon need to be updated (stage 104). This determination can be made by the primary add-in, such as when a user selects an option that would benefit from having an updated set of options displayed in the ribbon. An update mechanism is then called to update the ribbon (stage 106), as described in further detail in FIGS. 4 and 5. The updated ribbon is then displayed (stage 108).

Figure 3:
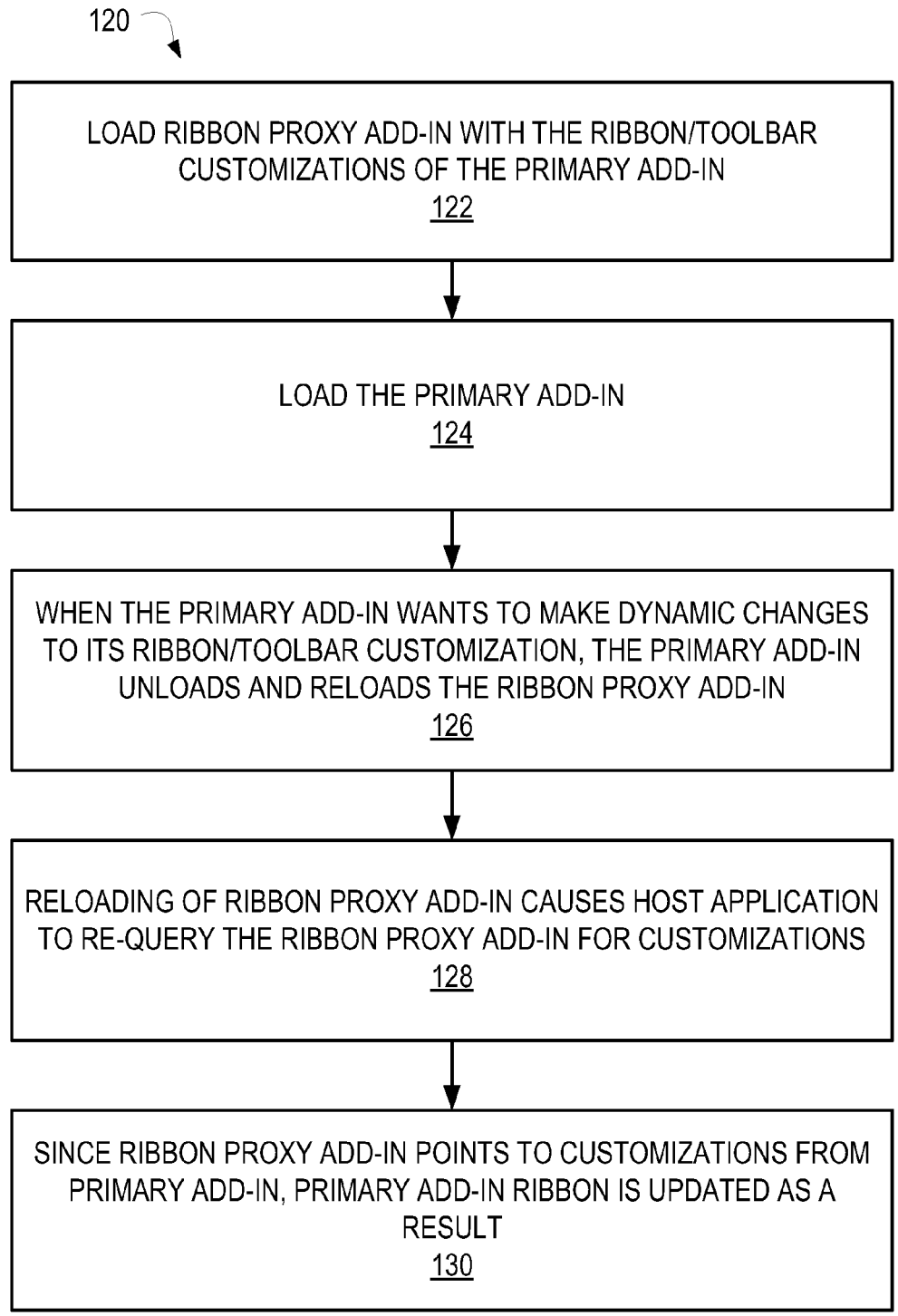

FIG. 3 is a process flow diagram 120 for one implementation illustrating the stages involved in using a ribbon proxy add-in to make dynamic customizations to a primary add-in. The system loads a ribbon proxy add-in with the ribbon customizations of the primary add-in (stage 122). The system then loads the primary add-in (stage 124). When the primary add-in wants to make dynamic changes to its ribbon customization, the primary add-in unloads and reloads the ribbon proxy add-in (stage 126). This reloading of the ribbon proxy add-in causes the host application to re-query the ribbon proxy add-in for the customizations (stage 128). Since the ribbon proxy add-in points to customizations from the primary add-in, the ribbon of the primary add-in is updated as a result (stage 130). In the implementation introduced in FIG. 1, the customizations can be contained in a string contained in an XML file, and when the string is loaded by the host application, the ribbon is updated as a result. Some exemplary processes for loading the ribbon on host startup and re-loading the ribbon at a later point in time will now be described in FIGS. 4 and 5.

Figure 4:
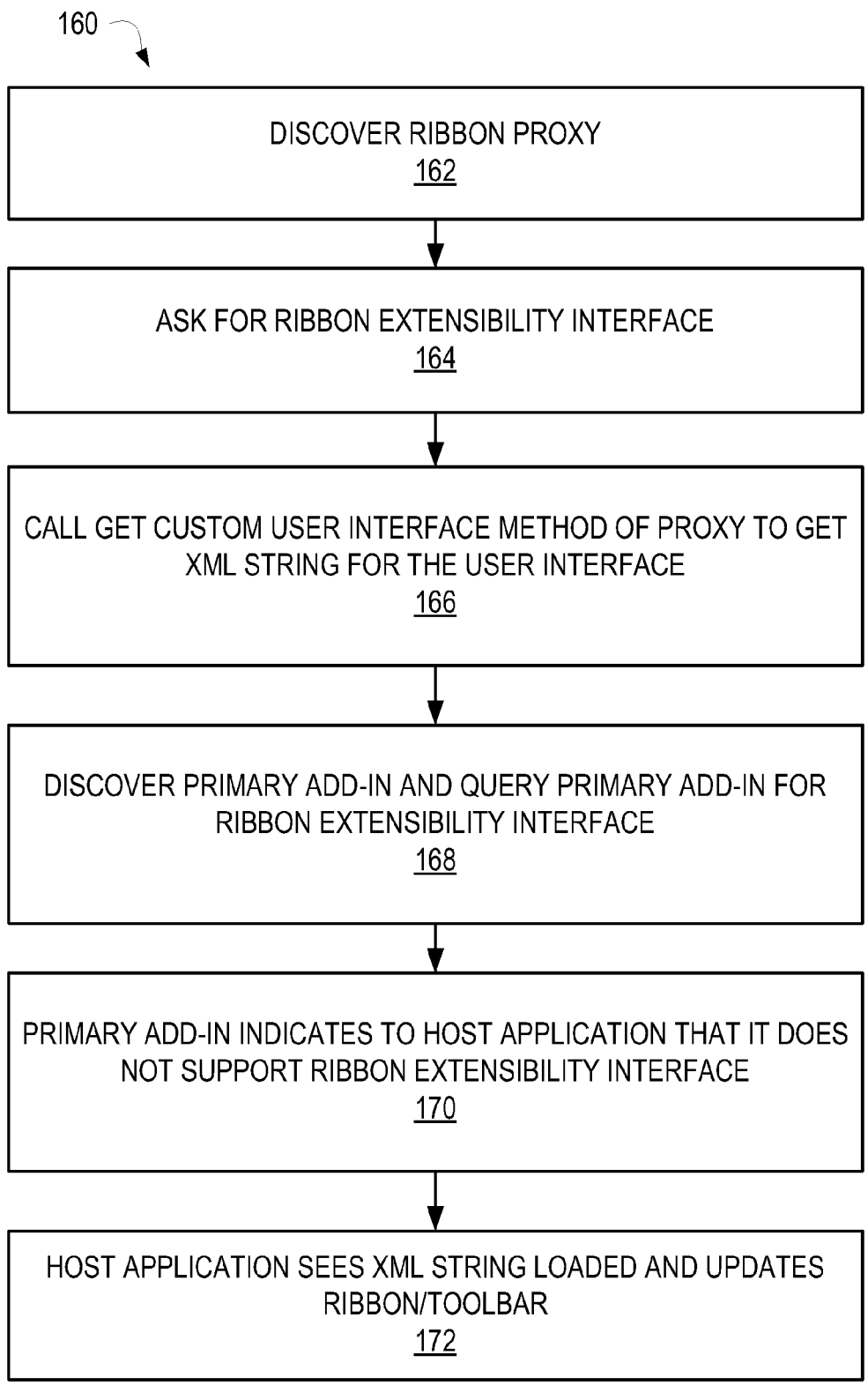
FIG. 4 is a process flow diagram for one implementation illustrating the stages involved in loading ribbon add-ins on host startup.

FIG. 4 is a process flow diagram 160 for one implementation illustrating the stages involved in loading ribbon add-ins on host startup. The system discovers the ribbon proxy add-in (stage 162). The system asks for the ribbon extensibility interface of the ribbon proxy add-in (stage 164), or another interface for communicating with the ribbon proxy add-in. A get custom user interface method is called of the ribbon proxy add-in to get the XML string for the user interface (which contains the customizations of the primary add-in) (stage 166). In one implementation, what actually happens during this step is that the ribbon proxy add-in asks the primary add-in for its ribbon extensibility interface, and then calls the get custom user interface method for the primary add-in. The get custom user interface method of the primary add-in then returns the XML string for the user interface to the ribbon proxy add-in.

The primary add-in is then discovered by the host application, and the primary add-in is queried by the host application for its ribbon extensibility interface (stage 168), or another interface. The primary add-in indicates to the host application that the primary add-in does not implement a ribbon extensibility interface (stage 170). In one implementation, the reason the primary add-in indicates to the host application that it does not implement a ribbon extensibility interface is because the interface was private and only exposed to the ribbon proxy add-in (as described in stage 168). When the host application sees that the XML string is loaded (from when the ribbon proxy add-in was loaded), the host application then updates the ribbon based on the XML string (stage 172).

In other words, on first load, the host application fetches the ribbon customization settings (e.g. in an XML file) from the proxy add-in. The primary add-in can also dynamically update the customization settings (e.g. in the XML string, etc.) at any time after first load, as will now be described in further detail in FIG. 5.

Figure 5:
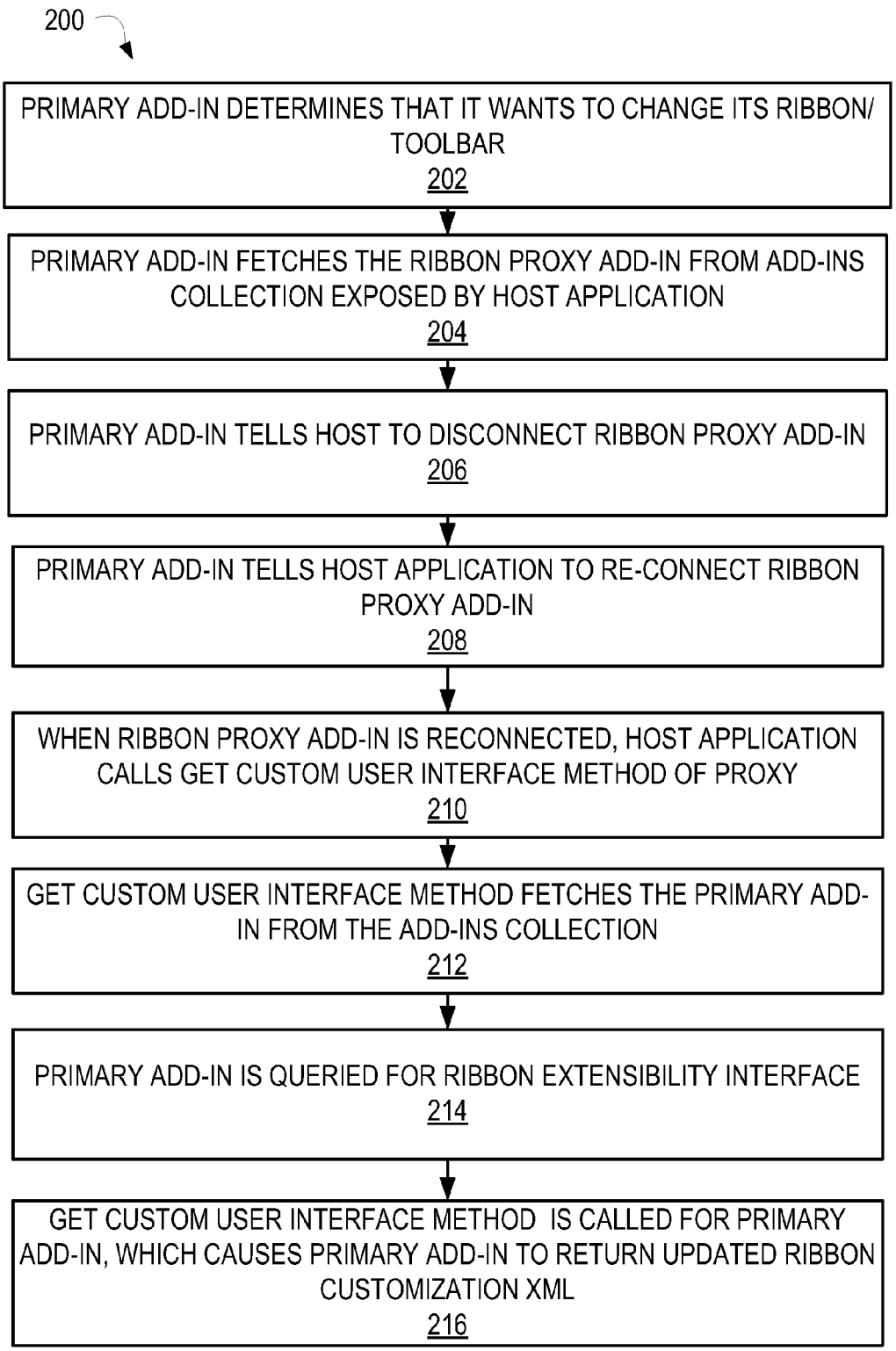
FIG. 5 is a process flow diagram for one implementation illustrating the stages involved in dynamically updating a ribbon add-in after host startup.

FIG. 5 is a process flow diagram 200 for one implementation illustrating the stages involved in dynamically updating a ribbon add-in after host startup. The primary add-in (or another application or component) determines that the primary add-in should change its ribbon (stage 202). As one non-limiting example, the user may have selection an option or performed some operation with the host application that would make it useful to present an updated ribbon for the primary add-in to present the user with new options. The primary add-ins then fetches the ribbon proxy add-in from add-ins collection exposed by the host application (stage 204). The primary add-in notifies the host application to disconnect the ribbon proxy add-in (stage 206). The primary add-in then notifies the host application to re-connect the ribbon proxy add-in (stage 208). When ribbon proxy add-in is reconnected, the host application calls the get custom user interface method of the ribbon proxy add-in (stage 210), and the get custom user interface method initiated by the ribbon proxy add-in fetches the primary add-in from the add-ins collection (stage 212). The primary add-in is then queried by the ribbon proxy add-in for the ribbon extensibility interface (stage 214), which is accessible to the ribbon proxy add-in (but not the host in one implementation). The get custom user interface method is called for the primary add-in, which causes the primary add-in to return the updated ribbon customization XML to the ribbon proxy add-in (stage 216). When the ribbon proxy add-in contains the updated XML, the host sees the update and thus updates the ribbon.

In one implementation, as the primary add-in adds each new control dynamically to the ribbon customization, the primary add-in can map the control to a generic callback function (or to a finite set of generic callback functions). With generic callback functions, the specific identity of the control being invoked is passed in as a parameter to the function. In one implementation, the intention of this design is to support the model where multiple controls can be mapped to one function. The ribbon proxy mechanism can seamlessly take advantage of this behavior for dynamic controls.

Figure 6:
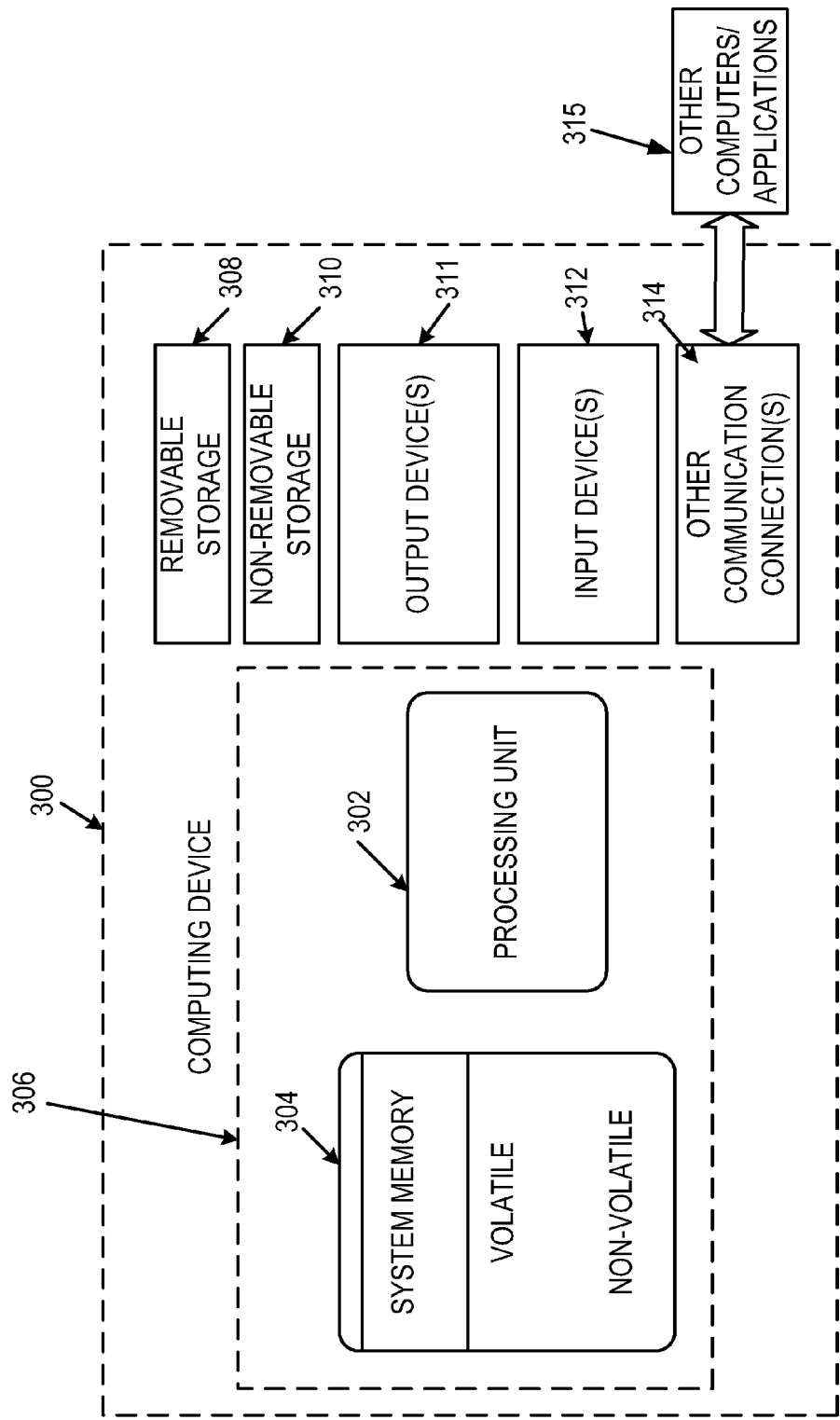
FIG. 6 is a diagrammatic view of a computer system of one implementation.

As shown in FIG. 6, an exemplary computer system to use for implementing one or more parts of the system includes a computing device, such as computing device 300. In its most basic configuration, computing device 300 typically includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 6 by dashed line 306.

Additionally, device 300 may also have additional features/functionality. For example, device 300 may also include additional storage (removable and/or non-removable) including, but not limited to, magnetic or optical disks or tape. Such additional storage is illustrated in FIG. 6 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 300. Any such computer storage media may be part of device 300.

Computing device 300 includes one or more communication connections 314 that allow computing device 300 to communicate with other computers/applications 315. Device 300 may also have input device(s) 312 such as keyboard, mouse, pen, voice input device, touch input device, etc. Output device(s) 311 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage medium having
computer-executable instructions for causing a computer to perform steps comprising:
loading a ribbon proxy add-in that has ribbon customizations for a ribbon of a primary add-in;
loading the primary add-in;
at a later point in time, unloading and reloading the ribbon proxy add-in, which causes a host application to re-query the ribbon proxy add-in for the ribbon customizations; and
since the ribbon proxy add-in points to the ribbon customizations of the primary add-in, updating the ribbon of the primary add-in as a result.

2. The computer storage medium of claim 1, wherein the ribbon proxy add-in is unloaded and reloaded when the primary add-in wants to make dynamic changes to the ribbon customizations of the ribbon.

3. The computer storage medium of claim 2, wherein the ribbon proxy add-in is unloaded and reloaded by the primary add-in.

4. The computer storage medium of claim 1, wherein the ribbon customizations are contained in a string.

5. The computer storage medium of claim 4, wherein the string is formatted in an XML format.

6. The computer storage medium of claim 4, wherein the reloading of the ribbon proxy add-in causes the string to be reloaded, thereby causing the ribbon to be updated as a result.

7. A method for loading a primary add-in and a ribbon proxy add-in on host startup comprising the steps of:
discovering a ribbon proxy add-in;
obtaining user interface details for the ribbon proxy add-in, which points to user interface details for a primary add-in;
discovering a the primary add-in;
receiving an indication from the primary add-in that the primary add-in does not support a ribbon extensibility interface; and
updating a ribbon on a toolbar menu based upon the user interface details returned for the ribbon proxy add-in.

8. The method of claim 7, wherein the obtaining user interface details for the ribbon proxy add-in step comprises calling a get custom user interface method associated with the ribbon proxy add-in.

9. The method of claim 7, wherein the user interface details for the ribbon proxy add-in are obtained in a string format.

10. The method of claim 9, wherein the string format is an XML format.

11. The method of claim 7, wherein the obtaining user interface details for the ribbon proxy add-in step comprises calling a method to retrieve the user interface details of the primary add-in.

12. The method of claim 7, wherein the ribbon proxy add-in is queried for a ribbon extensibility interface after the ribbon proxy add-in is discovered to determine how to obtain the user interface details.

13. The method of claim 7, wherein the ribbon on the toolbar menu is updated when a host application determines that a string containing the user interface details has been loaded.

14. The method of claim 7, wherein the obtaining user interface details for the ribbon proxy add-in step comprises:
calling a get custom user interface method for the ribbon proxy add-in, which then in turn calls the get custom user interface method for the primary add-in, which returns the user interface details.

15. The method of claim 14, wherein the calling of the get custom user interface method for the primary add-in causes an updated string to be returned with the user interface details.

16. A method for updating a primary add-in after host startup comprising the steps of:
determining that a primary add-in wants to change an associated ribbon on a toolbar menu;
fetching a ribbon proxy add-in;
requesting that a host application disconnect the ribbon proxy add-in;
requesting that the host application reconnect the ribbon proxy add-in; and
when the ribbon proxy add-in is reconnected by the host application, loading a customized string associated with the ribbon proxy add-in, thereby causing the associated ribbon to be updated on the toolbar menu.

17. The method of claim 16, wherein the ribbon proxy add-in is fetched from an add-ins collection exposed by the host application.

18. The method of claim 16, wherein the customized string is formatted as an XML string.

19. The method of claim 16, wherein the determining step is initiated upon request by the primary add-in when the primary add-in decides that the change to the associated ribbon is desired.

20. The method of claim 16, wherein when the ribbon proxy add-in is reconnected, the host application calls a get custom user interface method of the ribbon proxy add-in, the get custom user interface method of the ribbon proxy add-in then fetches the primary add-in from an add-ins collection, and the get custom user interface method is then called for the primary add-in by the ribbon proxy add-in, which is what causes the customized string to be loaded.

\* \* \* \* \*